United States Patent
Kiehn et al.

(10) Patent No.: US 12,128,758 B2
(45) Date of Patent: Oct. 29, 2024

(54) TANK ASSEMBLY FOR A MOTOR VEHICLE

(71) Applicant: FORD GLOBAL TECHNOLOGIES, LLC, Dearborn, MI (US)

(72) Inventors: Rainer Kiehn, Frechen (DE); Hans Guenter Grosch, Vettweiss (DE); Krystian Dylong, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 455 days.

(21) Appl. No.: 17/470,211

(22) Filed: Sep. 9, 2021

(65) Prior Publication Data

US 2022/0089021 A1 Mar. 24, 2022

(30) Foreign Application Priority Data

Sep. 23, 2020 (DE) .......................... 102020211938.4

(51) Int. Cl.
*B60K 15/07* (2006.01)
*B60K 15/03* (2006.01)
*B60K 15/067* (2006.01)

(52) U.S. Cl.
CPC .... *B60K 15/07* (2013.01); *B60K 2015/03453* (2013.01); *B60K 2015/0675* (2013.01)

(58) Field of Classification Search
CPC .......... B60K 15/07; B60K 2015/03453; B60K 2015/0675
USPC ......................................................... 280/834
See application file for complete search history.

(56) References Cited

U.S. PATENT DOCUMENTS

| 6,986,490 B2 * | 1/2006 | Eihusen | F17C 1/00 248/312 |
| 2008/0156809 A1 | 7/2008 | Mizuno et al. | |
| 2017/0082240 A1 * | 3/2017 | Mlinaric | F16F 15/08 |

FOREIGN PATENT DOCUMENTS

| DE | 10230635 A1 | 1/2004 | |
| DE | 10 2011 010 196 A1 | 1/2012 | |
| DE | 10 2013 018 779 A1 | 5/2015 | |
| DE | 10 2015 005 185 A1 | 12/2015 | |
| DE | 112006000144 B4 | 12/2016 | |
| DE | 102017004902 A1 * | 11/2018 | |
| GB | 535683 A | 4/1941 | |
| GB | 2023513 A * | 1/1980 | B60P 7/12 |

OTHER PUBLICATIONS

German Examination Report dated Aug. 26, 2022 for related German Appln. No. 102020211938.4; 6 Pages.

* cited by examiner

*Primary Examiner* — Mahmoud Gimie
(74) *Attorney, Agent, or Firm* — Brooks Kushman PC; David B. Kelly

(57) ABSTRACT

A tank assembly for a motor vehicle includes an axially extending compressed gas tank having a middle portion and axially terminal end portions, and a tank support configured to fasten the compressed gas tank to a vehicle body. The tank assembly has a guard device that catches the compressed gas tank in the event the tank and/or support become partially or fully detached from the vehicle. A guard support is configured to secure the guard device to the vehicle body. A retaining element forms an axial stop for a first end portion, and at least one pliable tension element, which extends axially and connects the retaining element to the guard support in a tension-transmitting manner.

18 Claims, 5 Drawing Sheets

TANK ASSEMBLY FOR A MOTOR VEHICLE

CROSS-REFERENCE TO RELATED APPLICATIONS

This application claims foreign priority benefits under 35 U.S.C. § 119(a)-(d) to DE Application 1020 2021 1938.4 filed Sep. 23, 2020, which is hereby incorporated by reference in its entirety.

TECHNICAL FIELD

The present disclosure relates to a compressed gas tank assembly for a motor vehicle.

BACKGROUND

Compressed gas tanks, or compressed gas containers, are used in the automotive sector to store, for example, natural gas, liquefied petroleum gas or hydrogen for fuel cells. The compressed gas tank conventionally has a cylindrical middle portion which is adjoined at the ends by curved or dome-like end portions. A compressed gas tank conventionally has an inner jacket, which is surrounded by an outer jacket, which consists of wound continuous fibers (rovings) in a polymer matrix. Fiber reinforcement is often essential for sufficient compressive strength.

The compressed gas tank may be secured to the vehicle body by one or more supports, wherein different installation positions and orientations of the compressed gas tank are known in the prior art. While comparatively simple supports may be sufficient for normal driving operation, the supports should withstand substantially higher forces to ensure that the tank does not become loose under extreme conditions. As such, at present the supports are typically designed for substantially higher forces than those experienced during normal driving operation. For this reason, the supports are typically rather large and rigid and increase the total mass, or total weight, of the vehicle.

DE 102 30 635 A1 shows a device for fastening: containers, such as, for example, high-pressure containers, fuel tanks, gas cylinders or the like, to the underbody of the body of a motor vehicle. The device has at least two tightening straps which enclose the container at least in part and two container holders to which the tightening straps are fastened, wherein the longitudinal axis of the container is oriented preferably transversely to the vehicle longitudinal axis. The container holders extend on both sides of the container parallel to the longitudinal axis of the container, wherein the container is arranged between the container holders.

DE 11 2006 000 144 B4 discloses a vehicle on which there is mounted at least one fuel gas tank in the form of a hydrogen tank, wherein the fuel gas tank is mounted such that a longitudinal direction thereof is in a direction transverse to the vehicle and such that a valve structure of the fuel gas tank is arranged on the opposite side of a platform of a passenger compartment, which is located only on one side of the vehicle in order to be separated from the platform. The valve structure comprises a valve which delivers the fuel gas substantially perpendicularly to the longitudinal direction of the fuel gas tank, wherein the fuel gas tank is mounted on the vehicle such that a delivery direction of the fuel gas from the safety valve is directed downwards from a horizontal position. The fuel gas tank is mounted on a roof of the vehicle, which has a cover which covers the fuel gas tank from above and has a plurality of ventilation openings. The fuel tank can be fastened to the vehicle roof.

GB 535 683 A discloses a flexible gas container for a motor vehicle. This gas container is carried in a framework which has upper and lower frames which surround panels or netting and are connected at their ends by hinged trapezoidal flaps which move outwardly as the container is deflated. The apices of the flaps at the front and rear of the container are connected by cords passing through loops at the sides of the container so that the sides move inwardly as the container is deflated. The corners of the upper and lower frame are connected by flexible members including springs to prevent swaying.

SUMMARY

It should be pointed out that the features and measures listed individually in the following description can be combined with one another in any technically expedient manner and show further embodiments of the claimed subject matter. The description additionally characterizes and gives details of the claimed subject matter in particular in association with the figures.

Various embodiments of the disclosure provide a tank assembly for a motor vehicle. The motor vehicle can be, for example, a passenger car or lorry (truck), wherein the mentioned motor vehicles are of course not intended to be limiting.

The tank assembly has an axially extending compressed gas tank, which has a middle portion and axially terminal end portions, and a tank support for fastening the compressed gas tank to a vehicle body. The compressed gas tank can in some circumstances also be referred to as a liquefied gas tank and usually serves to store a pressurized gas which serves to drive the motor vehicle, for example hydrogen for a fuel cell, natural gas (compressed natural gas, CNG), dimethyl ether (DME) or also liquefied petroleum gas (LPG, usually a mixture of butane and propane) for a correspondingly adapted combustion engine. Owing to the high pressure, the gas can in some circumstances be wholly or partially in the liquefied state within the compressed gas tank in the operating state. Nevertheless, the term "gas" is here used for the sake of simplicity, since even in such cases this corresponds to the state of aggregation under normal conditions.

The compressed gas tank extends axially, or is oriented axially, wherein it is generally elongated in the axial direction. That is to say, its dimension in the axial direction is larger than transversely thereto, for example at least twice as large or at least three times as large. The axial direction can also be referred to as the longitudinal axis of the compressed gas tank and usually corresponds to an axis of symmetry. It has a middle portion and, axially at the ends thereof, two end portions. According to a typical construction, the middle portion is symmetrical with respect to the axial direction and cylindrical, while the adjoining end portions are tapered. The shape of each end portion can be convexly or concavely curved at least in some portions, for example it can be similar to a hemisphere. The end portions are also referred to as the container bottom. The three portions can be manufactured individually and connected together, but it would also be conceivable to manufacture at least part of the middle portion in one piece with at least one end portion, for example by means of additive manufacturing. The tank usually has an inner jacket or liner, which is wound externally wholly or partially with bundles (so-called ravings) of continuous fibers, for example carbon fibers, glass fibers, aramid fibers etc. or also mixtures of different fibers, which in turn are embedded in a polymer matrix. As a result of this fiber reinforcement, in particular the compressive strength of the tank can be improved.

The tank support serves to fasten the compressed gas tank to a vehicle body. "Vehicle body" is used as a generic term for the body and chassis, that is to say for those components which usually form the sprung mass of the motor vehicle. In the state mounted as intended, the compressed gas tank is fastened to the vehicle body via the tank support. It is thereby possible that the tank support is formed in one piece with parts of the vehicle body, that is to say no clear separation between the vehicle body and the tank support is possible. The tank support can be in one-part or multi-part form. In particular, it can consist of a plurality of spatially separate components which are fastened to different regions of the compressed gas tank. There are no limitations within the scope of the invention either in respect of the fastening to the vehicle body or in respect of the fastening to the compressed gas tank, a friction-based, form-fitting and/or substance-to-substance connection is possible in each case. As will become clear hereinbelow, the tank support is, however, designed for normal driving operation of the motor vehicle, that is to say, for example, for changes in speed in the range of up to 30 m/s². Possible materials for the tank support are, for example, metals such as steel or aluminum or composites such as fiber-reinforced plastics material.

The tank assembly further has a guard device which catches the compressed gas tank in the event it becomes detached from the tank support or the tank support becomes partially or fully detached from the vehicle body. The guard device, which can also be referred to as a catching device, containing device or retaining device, serves to catch contain, or retain the compressed gas tank if the tank becomes detached from the tank support. That is to say, for example, that the tank support is pulled away or breaks away from the vehicle body and/or from the compressed gas tank or breaks or ruptures in itself. In any case, the fastening of the compressed gas tank to the vehicle body provided by the tank support is lost. As already explained above, the tank support is designed such that it withstands the loading that occurs during normal driving operation and in this case securely connects the compressed gas tank to the vehicle body. However, the tank support can be designed such that changes in vehicle speed above a specific value, for example 30 m/s², it is no longer able to ensure a secure connection. In this case, the guard device provides protection, which prevents the compressed gas tank from becoming detached and flying around in an uncontrolled manner. The presence, or effectiveness, of the protection can depend on the direction of the acceleration that occurs.

The guard device has a guard support for fastening to the vehicle body. In the state mounted as intended, the guard device is fastened to the vehicle body via the guard support. It is thereby possible that the guard support is formed in one piece with parts of the vehicle body, that is to say a clear separation between the vehicle body and the guard support is not possible. The guard support can be in one-part or multi-part form and can optionally consist of a plurality of spatially separate components. There are no limitations within the scope of the invention in respect of the fastening to the vehicle body. The connection can be a friction-based, form-fitting and/or substance-to-substance connection.

The guard device further has a retaining element which forms an axial stop for a first end portion. The term "first end portion" serves merely for distinction and in this respect is not to be interpreted as being limiting. It can be the end portion at which the compressed gas tank has a valve. The retaining element forms an axial stop, that is to say a stop in the axial direction, for this first portion. If the compressed gas tank moves in the axial direction relative to the vehicle body, the retaining element forms a stop for the first end portion. That is to say, a form fit in the axial direction prevents the first end portion—and thus the compressed gas tank as a whole—from being able to move past the retaining element. It can also be said that the retaining element is configured to establish an axial form fit with the first end portion at least in the event of an axial movement of the compressed gas tank relative to the vehicle body.

The guard device further has at least one pliable tension element which extends axially and connects the retaining element to the guard support in a tension-transmitting manner. The respective tension element connects the retaining element to the guard support in a tension-transmitting manner, that is to say it is able to transmit tensile threes between the retaining element and the guard support. However, it is pliable and thus flexible. It can additionally be referred to as slack under pressure, that is to say it is not designed to transmit compressive forces. The tension element extends axially but generally does not run parallel to the axial direction. Owing to its pliability, it generally also does not run straight. However, owing to its pliable form, it is able to adapt or conform to the shape of the compressed gas tank. Finally, the fact that the tension element must be tension-transmitting but nevertheless is designed to be pliable means that it can be designed to be comparatively material-saving or lightweight. In particular, the retaining element can be formed from a plurality, or a large number, of individual fibers or strands which are bendable on their own and in their totality but nevertheless have a considerable tensile strength in their totality.

By means of the at least one tension element, the retaining element is connected to the guard support and thus—in the mounted state—to the vehicle body. If the compressed gas tank moves in the axial direction relative to the vehicle body, a form fit with the retaining element occurs, as described, wherein a force is again transmitted between the retaining element and the guard support via the at least one tension element. Since the guard support is fastened to the vehicle body, the movement of the retaining element, and thus the movement of the compressed gas tank, is limited or stopped. That is to say, the compressed gas tank is prevented by the guard device from moving uncontrollably (or "flying off") if the compressed gas tank becomes detached from the vehicle body. In contrast to a substantially rigid tank support, a certain resilient and/or plastic elongation of the at least one tension element can also occur in some circumstances when the compressed gas tank is contained. This can be advantageous, since abrupt stopping of the compressed gas tank is thereby prevented or moderated. Both the retaining element and the guard support are thus relieved of load.

Each tension element is held on the one hand on the retaining element and on the other hand on the guard support, at least such that the tensile threes can be transmitted without the tension element becoming detached. Advantageously, each tension element can be secured to the retaining element such that the at least one tension element is pulled together radially at the retaining element relative to the middle portion of the compressed gas tank. It has been shown that it is optimal for the functioning of the guard device if each tension element is in comparatively close contact with the compressed gas tank. This can better be achieved, in particular in the case of a tapering first end portion, if the at least one tension element is pulled together radially, that is to say in the radial direction, as described.

The axial direction preferably differs by not more than 30° from the vehicle longitudinal direction and the retaining element is arranged in front of the guard support in the direction of travel. The axial direction can further differ by not more than 20° or not more than 10° from the vehicle longitudinal direction (X-direction) or run parallel thereto. In this configuration, the retaining element is arranged in front of the guard support in the direction of travel, so that the at least one tension element extends, relative to the vehicle longitudinal direction, from back to front from the guard support to the retaining element. Thus, if the compressed gas tank moves forward relative to the vehicle body, the first end portion, which in this embodiment is located at the front, is stopped by the retaining element.

In principle, the guard device can have exactly one tension element which consists, for example, of a woven fabric and surrounds the compressed gas tank in the manner of a tube. According to another embodiment, the guard device has at least three tension elements which are distributed tangentially around the compressed gas tank. Each of the tension elements is usually strand-shaped, for example in the form of a strap or the like. The individual tension elements are arranged around the compressed gas tank, that is to say they extend axially, while they are arranged radially on the outside of the compressed gas tank. They are thereby distributed tangentially around the compressed gas tank and thus offset or spaced apart from one another in the tangential direction. In this context, the compressed gas tank is arranged between two tension elements, that is to say is effectively enclosed thereby, in every direction perpendicular to the axial direction. In this manner, lateral (that is to say non-axial) movements of the compressed gas tank can also be restricted at least to a limited extent by the tension elements. It will be appreciated that protection against such lateral movements is improved if the number of tension elements is increased or the tangential extent thereof is increased. At least four tension elements can thus be provided. A similar effect can be achieved with a single tension element if it surrounds the compressed gas tank in the tangential direction at least for the most part. Where a plurality of tension elements is mentioned here, these can in some circumstances be portions of a single strand-shaped object which is guided in a suitable manner between the guard support and the retaining element. The tension elements are, however, usually configured so as to be separate from one another.

In one embodiment, the retaining element is in tangentially annularly closed form and has a first through-opening. The first through-opening has a cross section which is smaller than a cross section of the middle portion of the compressed gas tank. It is thus ensured that at least the middle portion cannot pass through the through-opening. On the other hand, it can be provided that the first end portion can be introduced into the through-opening, or can be guided through the through-opening, at least in part. The first end portion can then stick in the first through-opening to a certain extent during the axial movement, wherein a movement transversely to the axial direction is ruled out by the annularly closed form of the retaining element. The cross section of the first through-opening can in particular be circular. The same is true for the cross section of the retaining element. If the first end portion, as mentioned above, has a valve of the compressed gas tank, this valve in particular can pass through, or be guided through, the first through-opening.

At least one tension element is preferably in the form of a cable, that is to say the tension element in question is composed of a plurality of individual fibers, or strands, which are twisted and/or braided together. The individual strands can consist of metal, for example steel. However, other materials such as carbon fibers or fiber-reinforced plastics material are also conceivable as an alternative or in addition. The cable can have a core and a sheathing, wherein the sheathing can serve, for example, to protect the cable from corrosion or to protect other objects such as, for example, the compressed gas tank from being damaged on contact with the cable. The sheathing can consist, for example, of an elastomer such as rubber or a plastics material such as PVC or PTFE.

According to a further development, at least two tension elements are connected by a tangentially extending connecting element. The connecting element, like the tension elements, can be in pliable form. It can likewise be strand-shaped and can even be of the same nature as the tension elements. For example, two tension elements in the form of cables could be connected by a connecting element which is likewise in the form of a cable. Since the tension elements extend axially and thus usually along the longitudinal axis of the compressed gas tank, the connecting element in question extends tangentially. However, it does not have to run parallel to the tangential direction, which in some circumstances is scarcely possible simply because of its own pliability and that of the tension elements. For example, it can be inclined towards the axial direction and extend helically. It will be appreciated that a plurality of connecting elements can be provided. Two tension elements can also be connected by a plurality of connecting elements. The at least one connecting element can on the one hand serve to stabilize the tension elements relative to one another, which is advantageous in particular if the compressed gas tank moves not exactly axially. In addition, the at least one connecting element can secure the compressed gas tank laterally (that is to say transversely to the axial direction, usually in the radial direction).

In particular, at least one connecting element can be configured to extend all round circumferentially and to connect all the tension elements. That is to say, the connecting element in question extends completely round (that is to say through 360°) in the circumferential direction, wherein it can in particular be closed in an annular manner. It thereby connects all the tension elements together, wherein it can act as a kind of tension band. It will be appreciated that, in this embodiment, the securing of the compressed gas tank by the connecting element discussed above is particularly effective.

During normal driving operation of the motor vehicle, all the forces acting on the compressed gas tank are absorbed by the tank support. That is to say, the retaining device is loaded preferably only by its own mass or its own weight during normal driving operation. It would thereby be possible for the retaining element to be loosely in contact, for example, with the first end portion of the compressed gas tank. According to another embodiment, a mounting element is configured to connect the retaining element to the vehicle body in such a manner that the retaining element is spaced apart from the compressed gas tank. The mounting element is in this context to be understood purely functionally and can also be part of the retaining element. However, it could also be, for example, a type of arm or web via which the retaining element is held spaced apart from the vehicle body. In any case, the connection to the vehicle body is such that the retaining element is not in contact with the compressed gas tank but is spaced apart therefrom. In this manner, the retaining element can be prevented from damaging the compressed gas tank as a result of a relative movement of the retaining element and the compressed gas tank, which can occur during normal driving operation simply as a result of vibrations. The mounting element serves merely to secure the retaining element during normal driving operation and can therefore generally be designed to be lightweight and material-saving. It is usually provided that the mounting element gives way (for example breaks or ruptures) when the compressed gas tank exerts a force on the retaining element. For this purpose, the mounting element can even have a predetermined breaking point.

The functioning of the guard device can generally be improved further if the guard device has a guide element located axially opposite the retaining element relative to the compressed gas tank, wherein each tension element is guided through a guide opening of the guide element, whereby the at least one tension element is pulled together radially at the guide element relative to the middle portion of the compressed gas tank. The guide element is located axially opposite the retaining element relative to the compressed gas tank, that is to say the compressed gas tank is arranged in the axial direction (at least for the most part) between the guide element and the retaining element. While the retaining element is arranged in the region of the first end portion, the guide element is arranged in the region of the opposite second end portion. As already mentioned above, it is optimal for the functioning of the guard device if each tension element is in comparatively close contact with the compressed gas tank. This can better be achieved, in particular in the case of a tapering second end portion, if the at least one tension element, as described, is pulled together radially, that is to say in the radial direction. That is to say, because each tension element is guided through a guide opening which forms a form fit outwardly in the radial direction with the tension element, the at least one tension element is pulled inwards, for example in the case of a compressed gas tank with a circular cross section to a radius which is smaller than that of the middle portion. Depending on the embodiment, the tension element can be guided loosely through the guide opening or it can be secured within the guide opening, for example by a friction-based and/or substance-to-substance connection.

In the case of multiple tension elements, the guide element could have a single guide opening through which all the tension elements are guided. For example, it could be annular in form, with a central guide opening for all the tension elements. In order to improve the guiding of the tension elements and optionally also to facilitate assembly of the guard device, the guide element may have a plurality of tangentially distributed guide openings, wherein one tension element is guided through one guide opening. The size of the individual guide opening can correspond substantially to that of the associated tension element, so that there is no appreciable friction between the guide opening and the tension element. Alternatively, the guide opening can also be chosen to be larger, so that the tension element is received in the guide opening with play. Usually, but not necessarily, the guide openings are arranged circularly symmetrically to one another and at equal tangential distances from one another. It can be provided in some circumstances that the second end portion is in part introduced into the guide element, or guided through the guide element. For this purpose, the guide element can have a central through-opening, wherein the guide openings are arranged radially on the outside of the through-opening. The through-opening is thereby of such a size that it is able to receive the second end portion at least in part.

Further advantageous details and effects will be explained in greater detail hereinbelow with reference to embodiments shown in the figures.

DETAILED DESCRIPTION

Embodiments of the present disclosure are described below. However, it should be understood that the disclosed embodiments are only examples, and other embodiments may take various alternative forms. Drawings are not necessarily drawn to scale; and some functions may be exaggerated or minimized to show details of specific components. Therefore, the specific structural and functional details disclosed herein should not be interpreted as restrictive, but merely as a representative basis for teaching those skilled in the art to use the claimed subject matter in various ways. As will be understood by those of ordinary skill in the art, various features shown and described with reference to any one of the drawings may be combined with features shown in one or more other drawings to produce embodiments which may not be explicitly shown or described. The combination of the features shown provides representative embodiments for a typical application. However, various other combinations and modifications of features consistent with the teachings of the present disclosure may be expected for certain specific applications or embodiments.

In the various figures, identical parts are always provided with the same reference signs, and for this reason such parts are generally also described only once.

Figure 1:
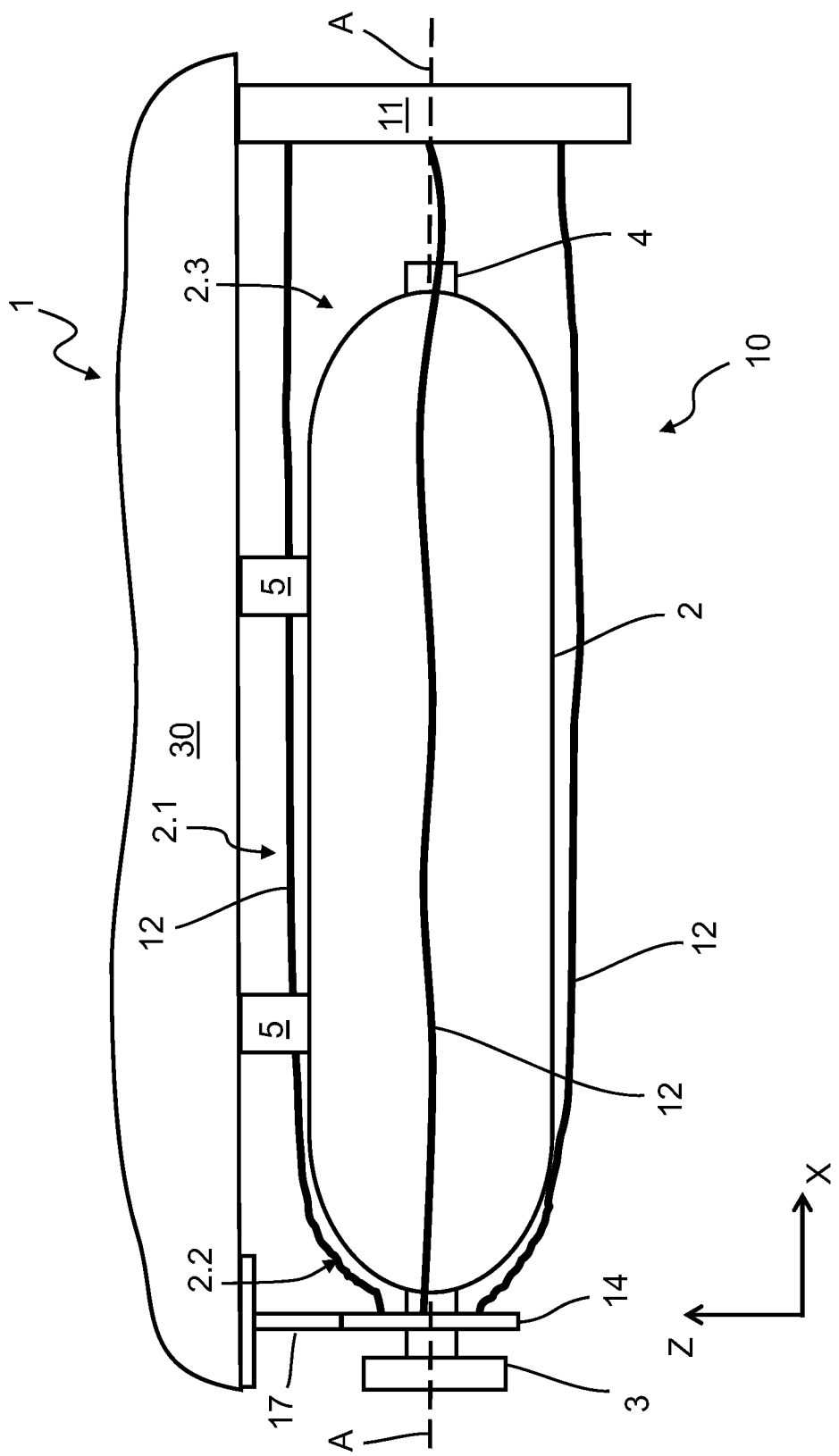
FIG. 1 is a schematic side view of a first embodiment of a tank assembly.
Figure 2:
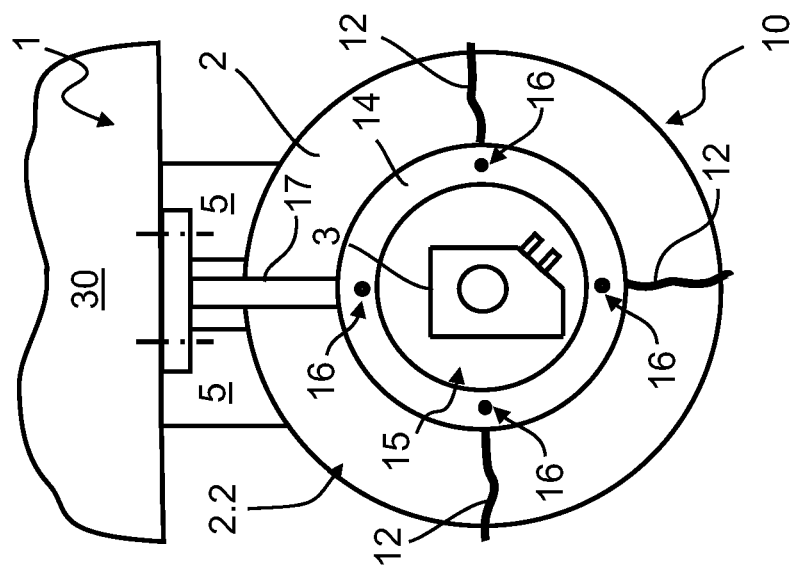
FIG. 2 is a schematic front view of the tank assembly from FIG. 1.

FIGS. 1 and 2 show schematic illustrations of a first embodiment of a tank assembly 1 according to one or more embodiments. A compressed gas tank 2 is connected via a multi-part tank support 5 to a vehicle body 30 of a motor vehicle, for example of a passenger car. The illustration of the tank support 5 is here to be understood purely schematically and can differ significantly from the actual situation. For example, fastening by means of hinged hand clamps could be provided, which hinged band clamps each engage around the compressed gas tank 2 and are in turn fastened to the vehicle body 30. The compressed gas tank 2 has a cylindrical middle portion 2.1 which extends parallel to an axial direction A which corresponds to a cylinder axis or tank axis. The course of the axial direction A in this case coincides with the X-axis of the motor vehicle. At a front end in the direction of travel, a first end portion 2.2 adjoins the middle portion 2.1, and at a rear end in the direction of travel, a second end portion 2.3 adjoins the middle portion. At the front end portion 2.2 there is arranged a valve 3 via which the compressed gas tank can be filled with pressurized gas and via which the pressurized gas can also be removed again. At the second end portion 2.3, the compressed gas tank has an endpiece 4 which serves substantially as a closing piece. The compressed gas tank 2 can have, for example, an inner jacket manufactured from plastics material and/or aluminum which, for stabilization, is surrounded by an outer jacket of fiber-reinforced plastics material.

During normal driving operation of the motor vehicle, the compressed gas tank is held on the vehicle body 30 by the comparatively lightweight and material-saving tank support 5. The tank support 5 is designed to hold the weight of the compressed gas tank 2 and to withstand the forces which are to be expected during normal driving operation. If those forces are exceeded, the tank support 5 may break or rupture in itself or it may become detached from the compressed gas tank 5 or from the vehicle body 30. In any case, there is in this respect no longer a secure connection between the compressed gas tank 5 and the vehicle body 30. In order to prevent the compressed gas tank 5 from being flung from the vehicle body 30 in an uncontrolled manner in such a case, a guard device 10 is provided. The guard device has a guard support 11 fastened to the vehicle body 30, to which guard support there are fastened four sheathed tension cables which serve as tension elements. The sheathing thereof can consist of PTFE, for example, while the core of each tension element consists of steel. The tension cables 12 extend in the axial direction to a retaining element 14, at which they are secured in receivers 16, for example by clamping or welding.

As can be seen in the front view in FIG. 2, the retaining element 14 is annular in form and has a first through-opening 15, through which the valve 3 projects. It is fastened to the vehicle body 30 via a first mounting element 17 in such a manner that it is held contactlessly relative to the compressed gas tank 2, as long as the tank support 5 is intact. As can be seen in FIG. 1, the receivers 16 are so arranged that the tension cables 12 are pulled together radially compared to the middle portion 2.1 in the region of the retaining element 14, that is to say they are there arranged closer to the tank axis. This has the result that they are in comparatively close contact with the first end portion 2.2. If the tank support 5 gives way, the compressed gas tank 2, owing to its inertia, moves in the axial direction relative to the vehicle body 30 towards the front of the vehicle, that is to say contrary to the X-axis pointing to the vehicle rear. The first end portion 2.2 is thereby pushed in part into the first through-opening 15 of the retaining element 14.

The first mounting element 17 is very lightweight and material-saving, so that may not be able to withstand forces acting on the retaining element 14 that significantly exceed normal driving threes. It may be deformed and break so that the retaining element 14 is held only via the tension cables 12 and remains connected to the vehicle body 30 via the tension cables and the guard support 11. Although the tension cables 12 are pliable and slack under pressure, they act in a tension-transmitting manner between the guard support 11 and the retaining element 14 and, despite their low mass, have considerable tensile strength. Since the tension cables 12 are distributed tangentially around the compressed gas tank 2, they are also able to prevent a lateral movement thereof (transversely to the axial direction A) at least to a certain extent. In any case, the compressed gas tank 2 is caught and braked and damage to the compressed gas tank 2 is unlikely. In this context, a certain resilient and/or plastic elongation of the tension cables 12 can be wholly advantageous, since abrupt stopping of the compressed gas tank 2 is thereby prevented or moderated, so that both the retaining element 14 and the guard support 11 are relieved of load.

Figure 4:
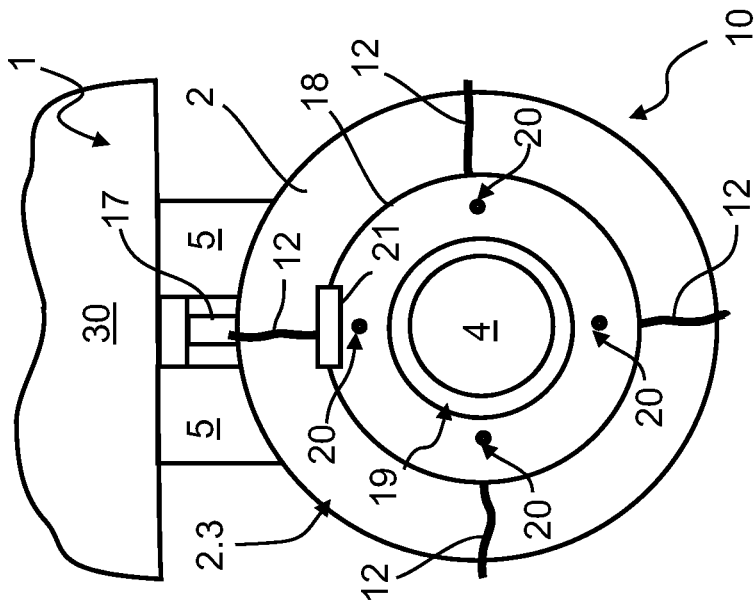
FIG. 4 shows a sectional illustration corresponding to line IV-IV in FIG. 3.
Figure 3:
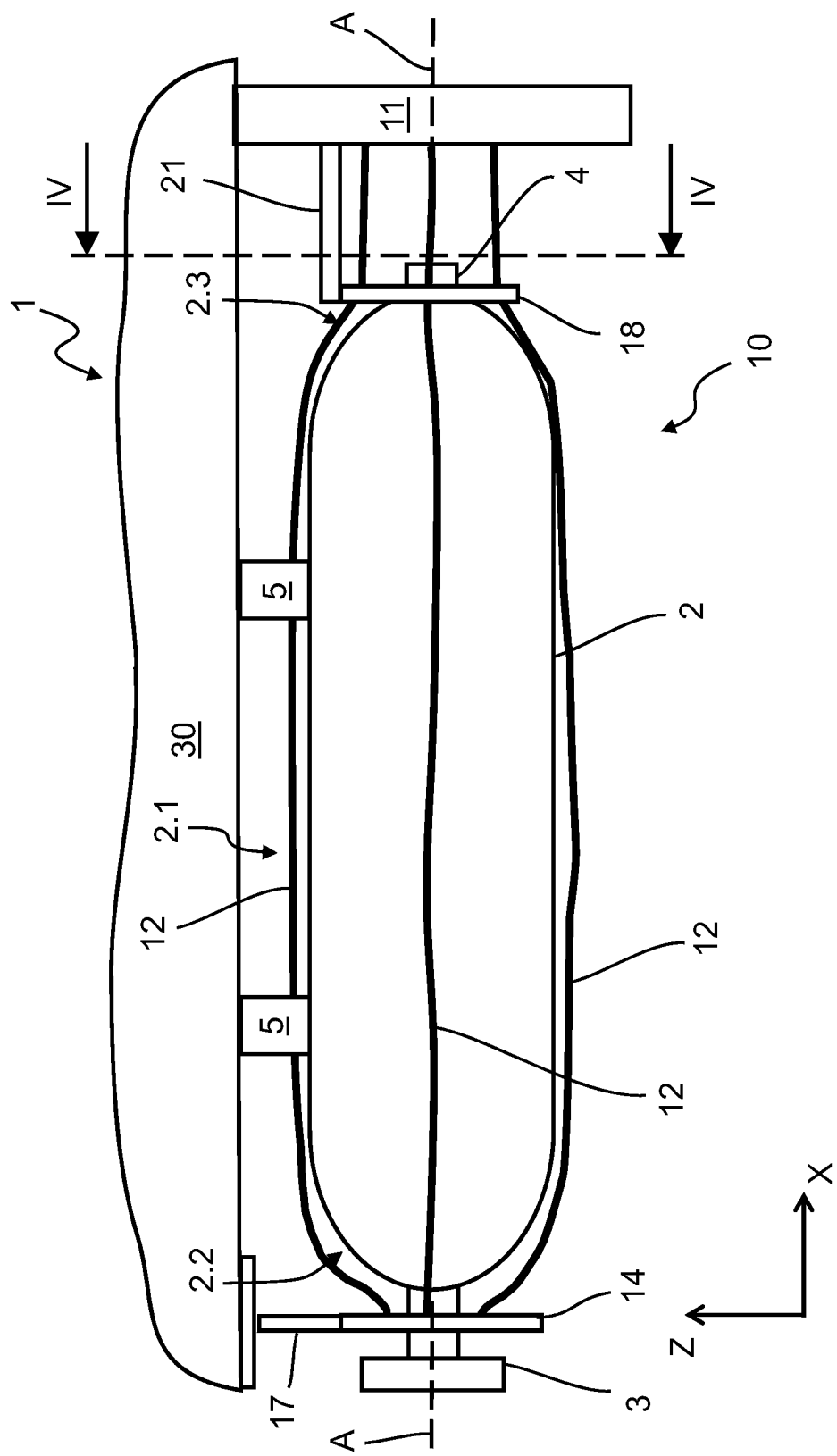
FIG. 3 is a schematic side view of a second embodiment of a tank assembly.

FIGS. 3 and 4 show schematic illustrations of a second embodiment of a tank assembly 1 according to the invention, which largely corresponds to the first embodiment and in that respect will not be explained again. In this case, a guide element 18 is additionally provided in the region of the second end portion 2.3, which guide element is fastened to the guard support 11 via a second mounting element 21. The structure of the guide element 18 can better be seen in the sectional illustration of FIG. 4. It is annular in construction and has a second through-opening 19, through which the endpiece 4 of the compressed gas tank 2 is guided. A plurality of guide openings 20 is arranged around the through-opening 19, wherein one tension cable 12 is guided through one guide opening. The guide openings 20 are arranged along a circle with a diameter which is smaller than the diameter of the cylindrical middle portion 2.1, so that the tension cables 12 are pulled together radially in the region of the guide element 18 as compared to the middle portion 2.1. As a result, the tension cables 12 overall are more closely in contact with the compressed gas tank 2, so that the compressed gas tank can better be caught in the event the compressed gas tank 2 breaks free from the tank support 5. This is the case in particular inasmuch as a lateral movement of the compressed gas tank 2. (transversely to the axial direction A) can better be prevented. The tension cables 12 can be secured, for example clamped, in the guide openings 20.

Figure 5:
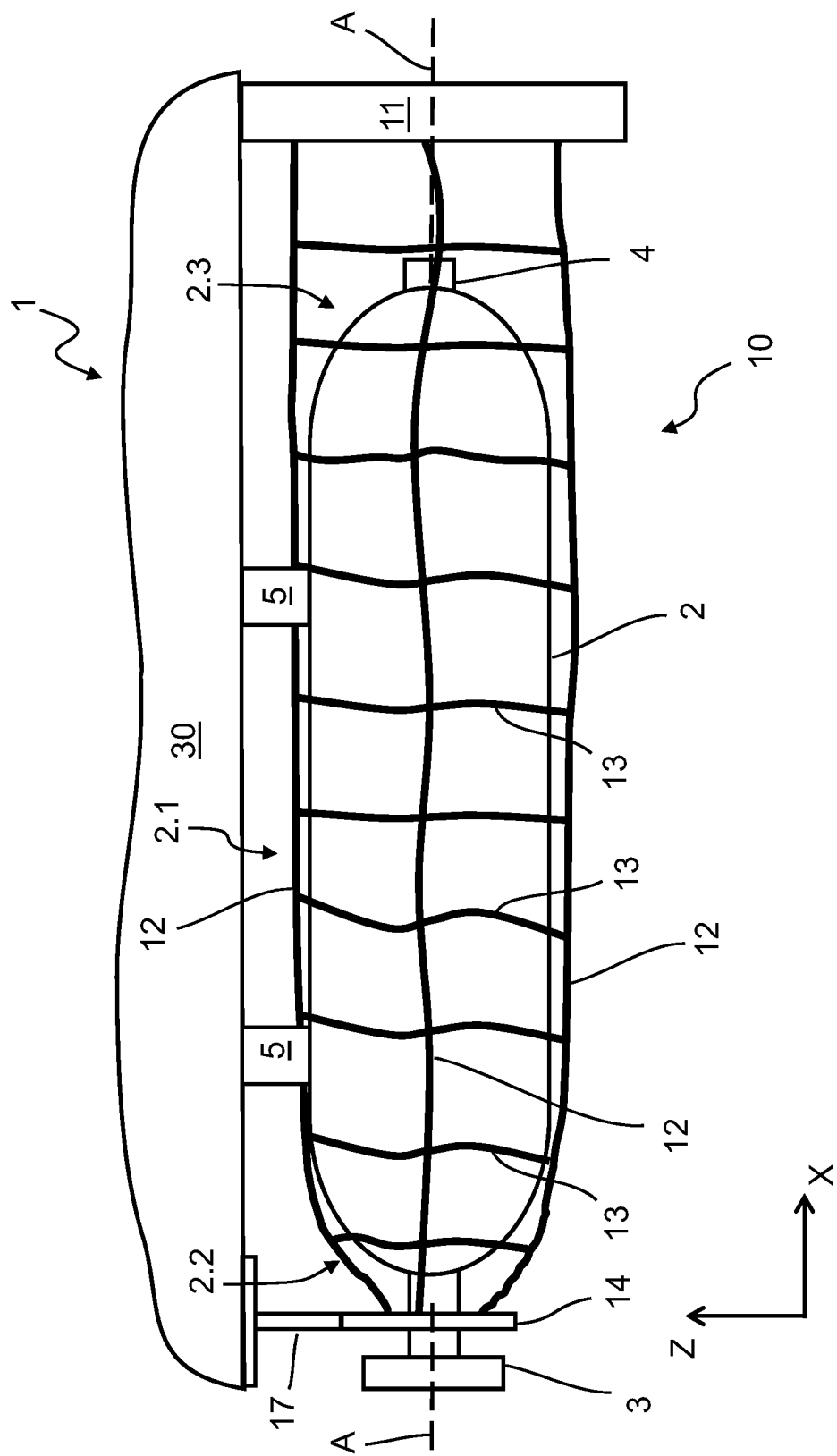
FIG. 5 is a schematic side view of a third embodiment of a tank assembly.
Figure 6:
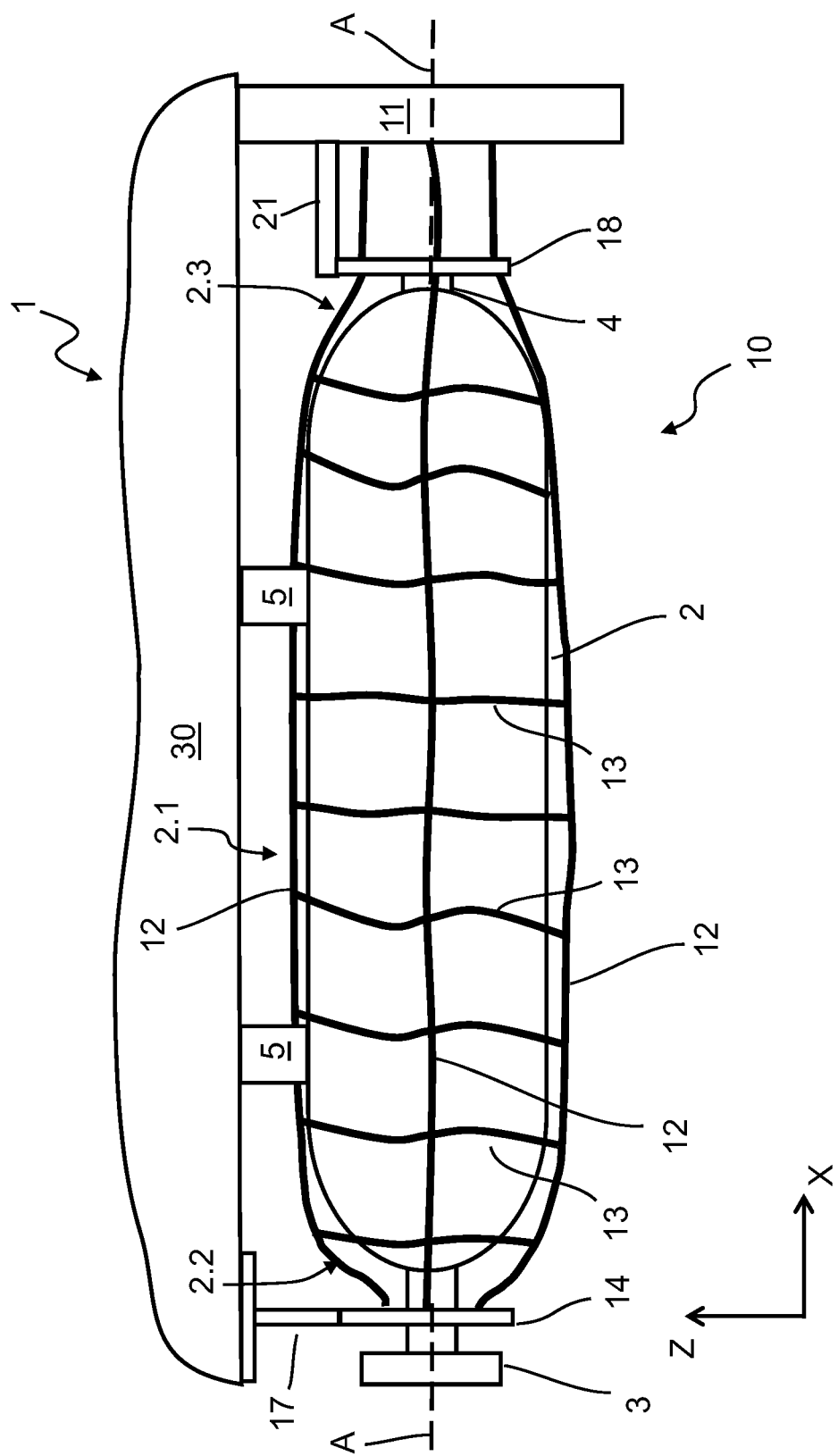
FIG. 6 is a schematic side view of a fourth embodiment of a tank assembly.

FIGS. 4 and 5 show a third and fourth embodiment of a tank assembly 1, which embodiments correspond to the first and second embodiments, respectively, and in that respect will not be explained again. However, the tension cables 12 are in this case connected together by connecting cables 13, which are likewise in the form of sheathed steel cables. The connecting cables 13 extend all round tangentially and serve as connecting elements. The cohesiveness of the tension cables 12 is thereby improved, and the gaps between the tension cables 12 in the tangential direction are bridged, so that the compressed gas tank 2 can no longer move through the gaps. The tension cables 12 and connecting cables 13 together form a type of net, which securely receives the compressed gas tank 2. This is advantageous in particular when the force acting between the compressed gas tank 2 and the vehicle body 30 acts not predominantly parallel to the X-axis but predominantly parallel to the Y-axis.

Although representative embodiments are described above, it is not meant that these embodiments describe all possible forms covered by the claims. The words used in the specification are descriptive words rather than restrictive words, and it should be understood that various changes can be made without departing from the claimed subject matter. As mentioned above, the features of the various embodiments can be combined to form further embodiments of the present disclosure that may not be explicitly described or illustrated. Although various embodiments can be described as providing advantages or advantages over other embodiments or prior art implementations in terms of one or more desired characteristics, those of ordinary skill in the art recognize that, depending on specific applications and implementations, one or more features or characteristics can be compromised to achieve the desired overall system properties. These attributes comprise but are not limited to, strength, durability, life cycle, marketability, appearance, packaging, size, maintainability, weight, manufacturability, ease of assembly, etc. Therefore, embodiments described as less desirable than other embodiments or prior art implementations in one or more characteristics are outside the scope of the present disclosure and may be expected for specific applications.

What is claimed is:

1. A vehicle compressed gas tank assembly, comprising:
a compressed gas tank having a middle portion and axially terminal end portions;
a tank support configured to fasten the compressed gas tank to a vehicle body;
a guard configured to catch the compressed gas tank if the compressed gas tank becomes at least partially detached from the vehicle body or the tank support;
a guard support connected to the guard and configured to fasten the guard to the vehicle body;
a retaining element forming an axial stop for a first one of the terminal end portions of the compressed gas tank; and
a plurality of axially extending elements connecting the retaining element to the guard support; and
a mounting element configured to connect the retaining element to a vehicle body.

2. The vehicle compressed gas tank assembly of claim 1, wherein the axial direction differs by not more than 30° from a longitudinal direction of a vehicle when the compressed gas tank is secured to the vehicle, and the retaining element is arranged in front of the guard support toward a front of the vehicle.

3. The vehicle compressed gas tank assembly of claim 1, wherein the guard has at least three pliable axially extending tension elements which are distributed around the compressed gas tank.

4. The vehicle compressed gas tank assembly of claim 1, wherein the retaining element comprises an annular ring having a central through-opening.

5. The vehicle compressed gas tank assembly of claim 4, wherein the compressed gas tank includes a valve aligned with the central through-opening of the retaining element.

6. The vehicle compressed gas tank assembly of claim 5, wherein the at least three pliable axially extending tension elements extend through the annular ring of the retaining element.

7. The vehicle compressed gas tank assembly of claim 1, wherein at least one of the plurality of axially extending elements comprises a cable.

8. The vehicle compressed gas tank assembly of claim 1, wherein at least two connecting elements extend around a circumference of the compressed gas tank.

9. The vehicle compressed gas tank assembly of claim 8, wherein each of the connecting elements is connected to all axially extending tension elements.

10. The vehicle compressed gas tank assembly of claim 9, wherein each of the connecting elements comprises a cable.

11. The vehicle compressed gas tank assembly of claim 1, wherein the guard comprises:
a guide element located axially opposite the retaining element relative to the compressed gas tank and having a diameter smaller than the middle portion of the compressed gas tank, wherein each axially extending element is guided through an opening of the guide element.

12. The vehicle compressed gas tank assembly of claim 11, wherein the guide element has a plurality of circumferentially distributed guide openings, wherein each axially extending element passes through a respective one of the guide openings.

13. A vehicle comprising:
a compressed gas tank having a cylindrical middle portion and first and second axially terminal end portions, the compressed gas tank secured to a body of the vehicle by at least one tank connector;
a guard secured to the body of the vehicle by a guard support, the guard comprising:
an annular retaining element adjacent to the first terminal end portion of the compressed gas tank;
a guide element located axially opposite the annular retaining element adjacent to the second terminal end portion;
a plurality of tension elements extending axially along the compressed gas tank from the annular retaining element through at least one opening in the guide element to the guard support; and
a second guard support connected to the annular retaining element and the body of the vehicle.

14. The vehicle of claim 13, wherein the plurality of tension elements comprises a plurality of cables.

15. The vehicle of claim 14, wherein the guard further comprises:
a plurality of cables each extending around a circumference of the middle portion of the compressed gas tank and connected to each of the plurality of tension elements.

16. The vehicle of claim 15, wherein:
the annular retaining element includes a plurality of through holes;
the guide element includes a plurality of through holes; and
each of the tension elements passes through one of the through holes of the annular retaining element and one of the through holes of the guide element.

17. The vehicle of claim 13 wherein the compressed gas tank comprises a valve aligned with a central opening of the annular retaining element.

18. A system comprising:
a compressed gas tank having a cylindrical middle portion connected to first and second hemispherical end portions;
a plurality of connectors secured to the compressed gas tank and configured to connect to a vehicle;
an annular retaining element adjacent the first end portion and having a plurality of through holes spaced around the retaining element, and a central through hole surrounding at least a portion of a gas valve of the compressed gas tank;
a first guard support secured to the annular retaining element and configured to connect to the vehicle;
a second guard support adjacent the second end portion and configured to connect to the vehicle;
a guide element having at least one opening;
a plurality of first cables extending from the annular retaining element axially along the compressed gas tank through the at least one opening of the guide element to the second guard support; and
a plurality of second cables extending around a circumference of the middle portion of the compressed gas tank, each second cable connected to all of the first cables.

* * * * *